United States Patent [19]

Grychtol et al.

[11] Patent Number: 4,474,695

[45] Date of Patent: Oct. 2, 1984

[54] COMPLEX DYE MIXTURE CONTAINING AT LEAST TWO COBALT 1:2 COMPLEXES OF AZO DYES

[75] Inventors: Klaus Grychtol, Bad Dürkheim; Dietrich Lach, Friedelsheim, both of Fed. Rep. of Germany

[73] Assignee: BASF Aktiengesellschaft, Ludwigshafen, Fed. Rep. of Germany

[21] Appl. No.: 326,928

[22] Filed: Dec. 2, 1981

[51] Int. Cl.³ .................. C09B 45/10; C09B 45/20; D06P 1/10; D06P 3/02

[52] U.S. Cl. .................. 260/145 B; 8/639; 8/636; 260/163

[58] Field of Search ............. 260/145 B, 147; 8/636, 8/639

[56] References Cited

U.S. PATENT DOCUMENTS

| | | | |
|---|---|---|---|
| 2,120,799 | 6/1938 | Crossley et al. | 260/147 |
| 2,809,962 | 10/1957 | Freyermuth et al. | 260/147 |
| 2,826,572 | 3/1958 | Kuster | 260/145 B |
| 3,468,618 | 9/1969 | Buehler et al. | 8/17 |

FOREIGN PATENT DOCUMENTS

| | | | |
|---|---|---|---|
| 81108844.2 | 4/1982 | European Pat. Off. | 260/147 |
| 15292 | 9/1958 | Fed. Rep. of Germany | 260/145 B |
| 1044315 | 11/1958 | Fed. Rep. of Germany | 260/145 |
| 971896 | 4/1959 | Fed. Rep. of Germany | 260/147 |
| 2501449 | 7/1975 | Fed. Rep. of Germany | 260/145 B |
| 1246903 | 10/1960 | France | 260/147 |
| 719274 | 12/1954 | United Kingdom | 260/147 |
| 844873 | 8/1960 | United Kingdom | 260/145 |
| 858562 | 1/1961 | United Kingdom | 260/147 |

Primary Examiner—Floyd D. Higel
Attorney, Agent, or Firm—Oblon, Fisher, Spivak, McClelland & Maier

[57] ABSTRACT

Mixtures of two or more cobalt 1:2 complexes of azo dyes of the formula I

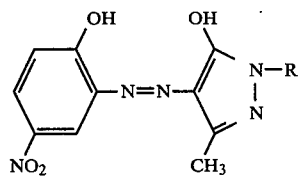

where R is

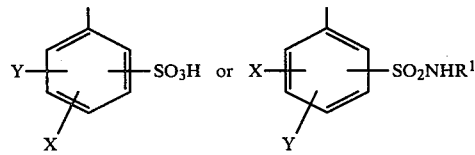

where $R^1$ is hydrogen, $C_1$–$C_{18}$-alkyl, or hydroxyalkyl or alkoxyalkyl which may be interrupted by oxygen, and X and Y are hydrogen, fluorine, chlorine, bromine, $C_1$–$C_4$-alkyl or $C_1$–$C_4$-alkoxy.

The mixtures according to the invention are particularly useful for dyeing leather.

7 Claims, No Drawings

COMPLEX DYE MIXTURE CONTAINING AT LEAST TWO COBALT 1:2 COMPLEXES OF AZO DYES

The present invention relates to mixtures of two or more cobalt 1:2 complexes of azo dyes of the formula I

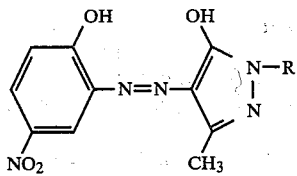

where R is

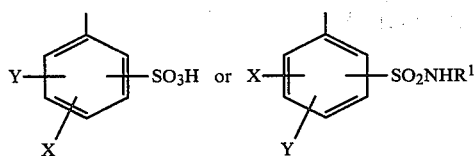

where $R^1$ is hydrogen, $C_1$-$C_{18}$-alkyl, or hydroxyalkyl or alkoxyalkyl which may be interrupted by oxygen, and X and Y are hydrogen, fluorine, chlorine, bromine, $C_1$-$C_4$-alkyl or $C_1$-$C_4$ alkoxy.

Alkyl radicals $R^1$ are, for example: $CH_3$, $C_2H_5$, $C_3H_7$, $C_4H_9$, $C_5H_{11}$, $C_6H_{13}$, $C_8H_{17}$, $C_{10}H_{21}$, $C_{12}H_{25}$, $C_{13}H_{27}$, $C_{14}H_{29}$, $C_{16}H_{33}$ and $C_{18}H_{37}$, each of these formulae including the n- and i-radicals.

Hydroxyalkyl and alkoxyalkyl radicals $R^1$ are, for example: $CH_2CH_2OH$, $CH_2CH_2CH_2OH$, $CH_2CHOHCH_3$, $CH_2CH_2OCH_3$, $CH_2CH_2OC_2H_5$, $CH_2CH_2OC_4H_9$, $CH_2CH_2OCH_2CH_2OH$, $(CH_2CH_2O)_2CH_2CH_2OH$, $CH_2CH_2OCH_2CH_2OCH_3$, $CH_2CH_2OCH_2CH_2OC_2H_5$ and $CH_2CH_2OCH_2CH_2OC_4H_9$.

X and Y are, for example, $CH_3$ $C_2H_5$ $OCH_3$ or $OC_2H_5$.

Preferably, $R^1$ is hydrogen, methyl or ethyl and X and Y are hydrogen.

The mixtures according to the invention are advantageously prepared by cobalting mixtures of the azo dyes of the formula I, which contain the substituents $SO_3H$ and $SO_2NHR^1$, by a conventional method. The dyes of the formula I which contain $SO_3H$ and $SO_2NHR^1$ can be present in the starting mixtures in a ratio of, for example, from 9:1 to 1:9, preferably in a ratio of about 1:1.

Details of the preparation may be found in the examples, in which, unless indicated otherwise, parts and percentages are by weight.

The mixtures according to the invention can be used for dyeing natural and synthetic polyamides, such as wool or nylon, and especially for dyeing leather, in brown shades. The very good build-up capacity on chrome-tanned leather which has been retanned with a synthetic/vegetable tanning agent is noteworthy.

EXAMPLE 30.8 parts of 4-nitro-2-amino-1-hydroxybenzene are dissolved in 200 parts of ice-water and 36 parts by volume of concentrated hydrochloric acid and are diazotized by adding 62 parts by volume of 23% strength sodium nitrite solution. Any excess nitrite is destroyed with 2 parts of amidosulfonic acid. The yellow diazo suspension is run into a solution of 26 parts of 1-(3'-sulfophenyl)-3-methyl-pyrazol-5-one and 26 parts of 1-(4'-sulfamoylphenyl)-3-methyl-pyrazol-5-one in dilute sodium hydroxide solution (pH=8). An approximately neutral reaction is maintained by slowly running in sodium hydroxide solution during the coupling. The temperature is kept below 20° C. by adding ice. When the coupling has ended, the mixture is heated to 40° C. and a total of 23 parts of hydrated cobalt chloride are sprinkled in a little at a time. The pH is kept at 6 by adding sodium hydroxide solution.

The dye obtained by salting out, filtering with suction and drying or by spray-drying dissolves in water to give a brown solution and dyes polyamides materials and, in particular, leather in brown shades. As well as the good lightfastness, the good build-up capacity is particularly noteworthy.

Similar dyes are obtained by the same procedure, using the coupling components listed:

(1) 26 parts of 1-(3'-sulfophenyl)-3-methyl-pyrazol-5-one, 26 parts of 1-(3'-sulfamylphenyl)-3-methyl-pyrazol-5-one, (2) 26 parts of 1-(4'-sulfophenyl)-3-methyl-pyrazol-5-one, 26 parts of 1-(4'-sulfamylphenyl)-3-methyl-pyrazol-5-one, (3) 26 parts of 1-(4'-sulfophenyl)-3-methyl-pyrazol-5-one, 26 parts of 1-(3'-sulfamylphenyl)-3-methyl-pyrazol-5-one, (4) 26 parts of 1-(4'-sulfophenyl)-3-methyl-pyrazol-5-one, 26 parts of 1-(3'-sulfophenyl)-3-methyl-pyrazol-5-one (5) 26 parts of 1-(4'-sulfamylphenyl)-3-methyl-pyrazol-5-one, 26 parts of 1-(3'-sulfophenyl)-3-methyl-pyrazol-5-one, (6) 32 parts of 1-(2',5'-dichloro-4'-sulfophenyl-3-methyl-pyrazol-5-one, 26 parts of 1-(3'sulfamylphenyl)-3-methyl-pyrazol-5-one, (7) 30 parts of 1-(2'-methyl-4'-sulfophenyl)-3-methyl-pyrazol-5-one, 26 parts of 1-(3'-sulfophenyl)-3-methyl-pyrazol-5-one, (8) 32 parts of 1-(3'-sulfophenyl)-3-methyl-pyrazol-5-one, 20 parts of 1-(4'-sulfamylphenyl)-3-methyl-pyrazol-5one,

We claim:

1. A complex dye mixture containing at least two cobalt 1:2 complexes of azo dyes of the formula:

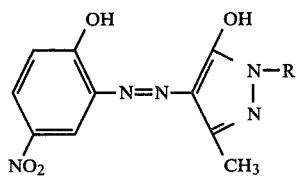

wherein R is

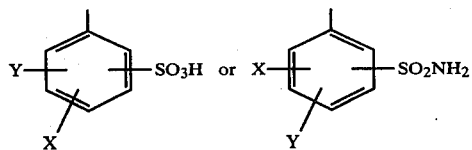

wherein X and Y are hydrogen, chlorine or methyl.

2. The dye mixture of claim 1 wherein X and Y are each hydrogen.

3. The dye mixture of claim 2, wherein the azo dyes of said cobalt complexes are the reaction product of the diazonium salt of 4-nitro-2-amino-1-hydroxybenzene and a mixture of 1-(3'-sulfophenyl)-3-methyl-pyrazol-5-one amnd 1-(3'-sulfamylphenyl)-3-methyl-pyrazol-5-one.

4. The dye mixture of claim 2, wherein the azo dyes of said cobalt complexes are the reaction product of the diazonium salt of 4-nitro-2-amino-1-hydroxybenzene and a mixture of 1-(4'-sulfophenyl)-3-methyl-pyrazol 5-one and 1-(4'-sulfamylphenyl)-3-methyl-pyrazol-5-one.

5. The dye mixture of claim 2, wherein the azo dyes of said cobalt complexes are the reaction product of the diazonium salt of 4-nitro-2-amino-1-hydroxy-benzene and a mixture of 1-(4'-sulfophenyl)-3-methyl-pyrazol-5-one and 1-(3'-sulfamylphenyl)-3-methyl-pyrazol-5-one.

6. The dye mixture of claim 2, wherein the azo dyes of said cobalt complexes are the reaction product of the diazonium salt of 4-nitro-2-amino-1-hydroxy-benzene and a mixture of 1-(3'-sulfophenyl)-3-methyl-pyrazol-5-one and 1-(4'-sulfamylphenyl)-3-methyl-pyrazol-5-one.

7. The dye mixture of claim 1, wherein the azo dyes of said cobalt complexes are the reaction product of the diazonium salt of 4-nitro-2-amino-1-hydroxy-benzene and a mixture of 1-(2',5'-dichloro-4'-sulfophenyl)-3-methyl-pyrazol-5-one and 1-(3'-sulfamylphenyl)-3-methyl-pyrazol-5-one.

* * * * *

UNITED STATES PATENT AND TRADEMARK OFFICE
CERTIFICATE OF CORRECTION

PATENT NO.   :   4,474,695
DATED        :   October 2, 1984
INVENTOR(S)  :   Grychtol et al.

It is certified that error appears in the above-identified patent and that said Letters Patent is hereby corrected as shown below:

On the title page the following should be added:

--[30]  FOREIGN APPLICATION PRIORITY DATA

December 31, 1980  Fed. Rep. Germany   30 49 552   --

Signed and Sealed this

Fourteenth Day of May 1985

[SEAL]

Attest:

DONALD J. QUIGG

Attesting Officer    Acting Commissioner of Patents and Trademarks